Aug. 29, 1961  W. G. PECK  2,997,919

VARIABLE POWER OBJECTIVE

Filed March 28, 1960

INVENTOR.
WILLIAM G. PECK
BY
Frank C. Parker
ATTORNEY

United States Patent Office
2,997,919
Patented Aug. 29, 1961

2,997,919
VARIABLE POWER OBJECTIVE
William G. Peck, Rochester, N.Y., assignor to Bausch & Lomb Incorporated, a corporation of New York
Filed Mar. 28, 1960, Ser. No. 17,878
4 Claims. (Cl. 88—57)

This invention relates to a zoom type of variable focal length optical system which works at finite conjugates and which is used as a projection objective in a micro-projector or the like.

In the past, micro-projectors and devices of this kind, such as shown for instance in Patent 2,806,406, issued September 17, 1957, to O. W. Boughton, have been supplied with a rotatable lens turret having a number of objectives of different powers mounted therein to project an image of a specimen in various steps of magnification. For obvious reasons it is desirable to replace such multiple-objective apparatus with a single "zoom" lens structure whereby a continuous variation of image size within a given range may be obtained. Efforts to utilize non-afocal variable power optical systems of the prior art in producing a simple, inexpensive microscope having variable power have not provided a satisfactory fulfillment of this need. Vexing design problems arise in regard to necessary apertures, evenness of illumination of the image throughout the zooming range, flatness of field, vignetting and correction of image aberrations.

In view of the above-mentioned as well as other disadvantages of "step" magnification and known "zoom" optical systems, it is an object of this invention to provide a novel zoom type of variable focal length objective for micro-projectors and the like which is simple in structure and inexpensive to manufacture, is relatively small in size and is easy to operate.

It is a further object to provide such a device which is not only low in cost but which projects a constant sized flat image, said image being corrected in a superior manner for all chromatic and monochromatic image errors and distortion and having more favorable vignetting threof.

Figure 1:
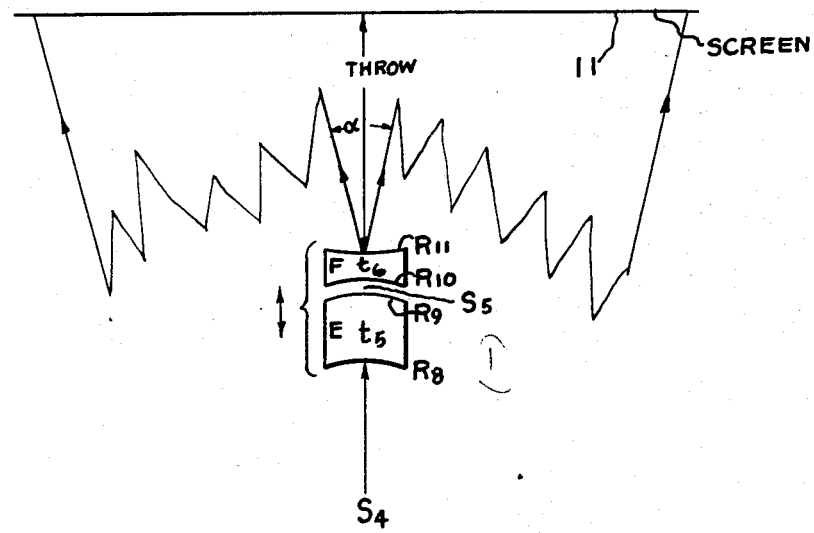
Figure 2:
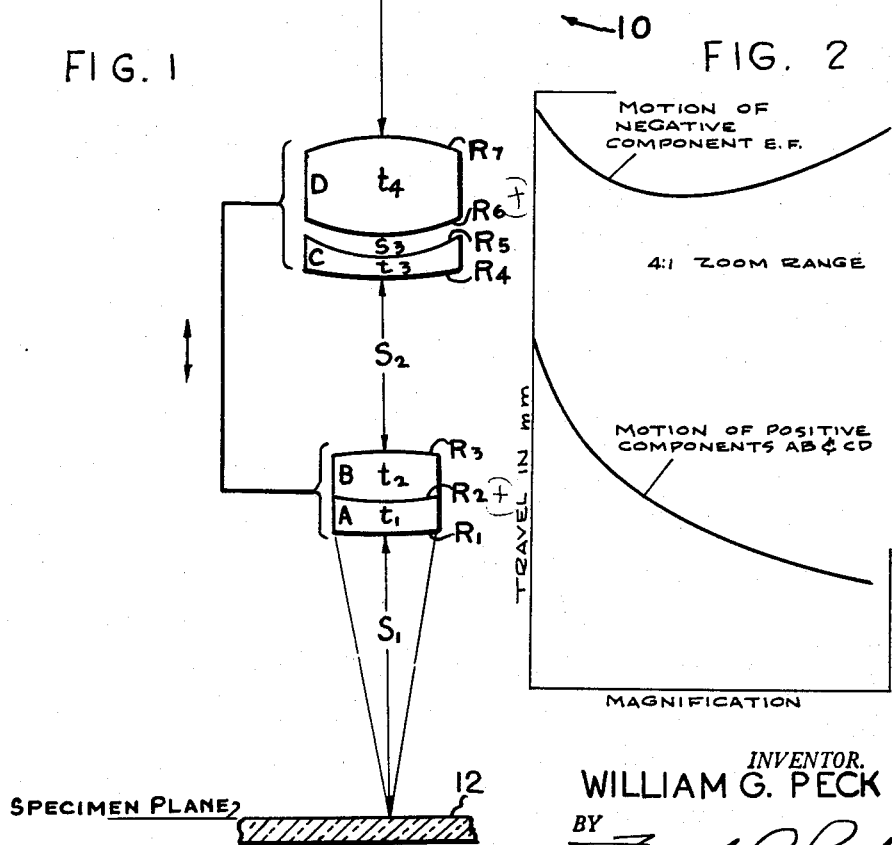

Further objects and advantages will be apparent in the details of structure and combination of parts from a study of the specification herebelow taken in connection with the accompanying drawing wherein FIG. 1 is an optical diagram representing one successful form of "zoom" optical system according to my invention, and FIG. 2 is a graph showing movements of the zoom components thereof.

The zoom type variable power optical system constituting this invention is particularly designed for use as the objective of a micro-projector although its use as a projection lens in other apparatus is recommended where the distance between the object to be magnified and the screen must be constant and unchanging for all magnifications of the image. In the present optical system the "throw" or distance from the rear lens to the screen as well as the lateral dimension of the image on the screen and consequently the projection angle subtended thereby are always constant for all magnifications. Therefore, as the magnification of the image is varied, the actual area of the object which is "seen" by the objective grows progressively larger or smaller. At large magnifications a smaller area of the specimen or object is seen than when the magnification is small.

In the preferred form of this invention as shown in the drawing and described herebelow, an optical system is shown generally at 10 comprising a front compound lens component AB located nearest to the specimen under observation. This lens is composed of a front meniscus lens element A which is convex toward the front of said system and a biconvex lens element B lying contiguously thereto and cemented thereto if desired. Compound lens component AB has positive power which is made up of the negative power of the lens element A and predominating positive power of the lens element B. The focal length of element A is numerically 75% of the focal length of the compound lens component AB and the focal length of the B element is numerically 47% of the focal length of the compound lens component AB. Spaced rearwardly from the compound lens component AB is a second positive or collective compound lens component CD having positive power. This compound lens component CD is made up of a meniscus lens element C which is convex toward the front of the optical system and spaced rearwardly therefrom is a companion biconvex lens element D. The negative lens element C has a negative focal length which is numerically 96% of the focal length of the compound lens component CD and the lens element D has a positive focal length which is numerically 55% of the focal length of the compound lens component CD. The two aforesaid positive compound components are mutually optically aligned and are connected together by suitable means, not shown, for like movements as a unit, as shown in FIG. 2 of the drawing.

Spaced rearwardly from the second compound positive lens component CD is a compound lens EF having negative power and composed of a meniscus element E which is concave toward the front of the optical system. Air spaced rearwardly therefrom is a companion lens element F which is biconcave in form and together with element E is optically aligned with said positive lenses. Lens element E has positive power and a focal length which is numerically substantially 2.2× the focal length of the compound lens component EF. Lens element F has negative power and a focal length which is numerically 78% of the focal length of the compound lens component EF. The optical system thus far described produces an image on a distant screen 11 located at a distance of about 24.2 times the greatest over-all length of the optical system comprising the three compound lenses. The image produced on the screen 11 has a constant lateral dimension and is located at a substantially constant distance rearwardly from the compound lens component EF and consequently the projection angle α is always constant regardless of changes in magnification.

According to this invention, the distribution of powers or relative focal lengths between the respective compound components in the optical system is very important. Consequently, the positive focal length of the first collective lens component AB should be 1.8 to 1.9 times the focal length of the second positive lens component CD. Correspondingly, the negative focal length of the dispersive compound lens component EF should be numerically 2.6 to 2.7 times the focal length of the first collective lens component AB.

In order to produce the zoom or variable power function of the optical system, the positive or collective lens members AB and CD, respectively, are effectively coupled together so as to move with like movements as a unit so as to maintain a constant separation therebetween as aforesaid while the negative or dispersive lens member EF is moved differentially with respect thereto, according to such a law that the image produced on the screen 11 is stationary and is always of constant size throughout the entire magnification range as shown in FIG. 2. During changes of magnifications, the separation of the front collective lens component AB from the specimen plane 12 changes, which means that the size of the object field or specimen area which is under observation varies according to the magnification of the image. Consequently, for low magnifications, the specimen area under observation is correspondingly larger than the area which is seen when high powers of magnification are used.

The above-described optical system is unusually well corrected for spherical and chromatic aberrations, coma, astigmatism, distortion and field curvature to produce a superior image on the screen at any and all magnifications within the magnification range of 4×.

A further feature of this invention concerns the aperture stop for the optical system, said stop being the free aperture of the lens AB whereby vignetting conditions are greatly improved.

A further advantage is gained by such a location of the aperture stop by reason of the fact that the image brightness for all magnifications of the image is thereby extremely uniform. Furthermore, the aperture size is constant for all magnifications of the optical system, thus eliminating the need for an aperture changing mechanism. The optical system is so designed as to have an excellent flat field over the entire effective field area by reason of the fact that the Petzval sum in this optical system is reduced to approximately four wavelengths of yellow light.

It is found very effective for the attainment of the above-described advantages in the optical system to provide a separation for the two positive lens components AB and CD, respectively, which lies between .35×the focal length of the positive lens member CD which has the shorter focal length, and .65×the focal length of the positive lens member AB which has the longer focal length. Furthermore, the difference between the refractive index of the A and B lens elements in the front positive lens component AB should be at least .13, and the difference between the Abbe numbers of these two aforementioned lens elements should be at least 25.0. It is correspondingly advantageous in this optical system that the difference between the refractive index of the C and D elements of the CD positive lens component is at least .18 and the corresponding difference between the Abbe numbers of said elements is at least 25.0. Furthermore, the difference between the refractive index of the E element and F element of the negative lens component EF should be at least .19 and the difference between the Abbe numbers of these same elements should be at least 18.0.

An optical system of superior performances according to the above-outlined parameters may be obtained using the range of values for the radius of curvature of the respective refractive surfaces of the lens elements as given in the table of inequalities herebelow, wherein the radii of curvature are designated by the letters $R_1$ to $R_{11}$, the lens thicknesses are designated by $t_1$ to $t_6$ and the axial separation of the components through the extremes of magnification range are designated $S_1$ to $S_5$.

$1.05F' < R_1 < 1.3F'$
$.35F' < R_2 < .43F'$
$.53F' < -R_3 < .65F'$
$.51F' < R_4 < .72F'$
$.24F' < R_5 < .30F'$
$.31F' < R_6 < .39F'$
$.35F' < -R_7 < .43F'$
$.26F' < -R_8 < .33F'$
$.21F' < -R_9 < .26F'$
$.21F' < -R_{10} < .26F'$
$.38F' < R_{11} < .46F'$
$.053F' < t_1 < .065F'$
$.088F' < t_2 < .108F'$
$.033F' < t_3 < .041F'$
$.165F' < t_4 < .205F'$
$.115F' < t_5 < .140F'$
$.045F' < t_6 < .053F'$
$1.35F' = S_1$ (least mag.)
$.386F' = S_1$ (greatest mag.)
$.31F' < S_2 < .37F'$
$.035F' < S_3 < .043F'$
$.175F' = S_4$ (least mag.)
$1.07F' = S_4$ (greatest mag.)
$.0214F' < S_5 < .0254F'$ wherein $F'$ is the focal length of the AB positive lens component and is equal to substantially .0166 times the back focus B.F. or throw of the objective.

A successful example of an optical system constructed as above described is given in the table herebelow, wherein $R_1$ to $R_{11}$ are the radii of refractive surfaces, $t_1$ to $t_6$ designate the axial thicknesses of the lens elements, $S_1$ to $S_5$ designate the axial air spaces separating the lens elements, and the refractive indices are designated $n_D$ for the material from which the lens elements are constructed and the Abbe numbers thereof are designated by $\nu$,

[Zoom Range=75× to 300×  B.F.=Throw=Approx. 3048 mm.]

| Lens Elem. | E.F.L. | Radii | Thickness | Air Spaces | $n_D$ | $\nu$ |
|---|---|---|---|---|---|---|
| A | −44.61 | $R_1$ =61.944 | $t_1$=3.00 | $S_1$=68.622 (when m=1) $S_1$=19.750 (when m=4) | 1.689 | 30.9 |
| B | +24.04 | $R_2$ =20.137 | $t_2$=5.00 |  | 1.524 | 51.0 |
|  |  | $R_3$ =−30.761 |  | $S_2$=16.90 |  |  |
| C | −35.184 | $R_4$ =33.729 | $t_3$=1.90 |  | 1.751 | 27.8 |
|  |  | $R_5$ =14.454 |  | $S_3$=2.00 |  |  |
| D | 20.21 | $R_6$ =18.707 | $t_4$=9.50 |  | 1.524 | 59.5 |
|  |  | $R_7$ =−20.137 |  | $S_4$=8.945 (when m=1) $S_4$=54.481 (when m=4) |  |  |
| E | 42.85 | $R_8$ =−15.276 | $t_5$=6.50 |  | 1.751 | 27.8 |
|  |  | $R_9$ =−12.246 |  | $S_5$=1.20 |  |  |
| F | −15.09 | $R_{10}$=−12.246 | $t_6$=2.50 |  | 1.506 | 59.6 |
|  |  | $R_{11}$=21.677 |  |  |  |  |

"m" denotes the magnification ratio. All scalar quantities are given in millimeters.

It wil be seen that there is here provided a zoom type of variable power optical system having peculiar advantages in micro-projectors and the like, said system being simple and inexpensive in construction while being of very high-grade performance, all of which is according to the objects of this invention.

Although but a single embodiment of this invention has been shown and described in detail, it will be understood that other embodiments are possible within the stated limitations of this disclosure and changes may be made in the detailed structure thereof without departing from the spirit of this invention as defined in the claims herebelow.

I claim:

1. A zoom type of pancratic objective for projecting a constant sized image of variable sized areas of an object field onto a distant screen by using a constant projection field angle for all magnifications of the image, said objective comprising a compound first positive lens component located nearest to said specimen, a second positive lens component located at a constant distance rearwardly of said first lens during all changes of power of said objective, and a compound negative lens component located rearwardly of said positive components, the positive components being connected together for duplicate movements as a unit and the negative lens component being moved differentially with respect to the motion of the positive components so as to change the magnification of the image while maintaining the axial position thereof substantially stationary, each compound lens component having a front and a rear lens element, the constructional data for said objective being given in the table of inequalities herebelow wherein $R_1$ to $R_{11}$ denote the radii of curvature of the refractive surfaces, $t_1$ to $t_6$ denote the axial thicknesses of the lens elements and $F'$ represents the focal length of the first positive lens component per se, $S_1$ to $S_5$ denote the axial spaces between said elements, the difference between the refractive indices of the glass in two elements of said first lens component being at least .13 and the corresponding difference between Abbe numbers therefor being at least 25.0, the difference between the refractive indices of the glass in two adjacent elements of said second lens component being at least .18 and the corresponding difference between the Abbe numbers therefor being at least 25.0, the difference between the refractive indices of the glass in two adjacent elements of said negative component being at least .19 and the corresponding difference between the Abbe numbers therefor being at least 18.0, and wherein $F'$ is equal to substantially .0166 times the back focus B.F. or throw of said objective, $1.05F' < R_1 < 1.3F'$
$.35F' < R_2 < .43F'$
$.53F' < -R_3 < .65F'$
$.51F' < R_4 < .72F'$
$.24F' < R_5 < .30F'$
$.31F' < R_6 < .39F'$
$.35F' < -R_7 < .43F'$
$.26F' < -R_8 < .33F'$
$.21F' < -R_9 < .26F'$
$.21F' < -R_{10} < .26F'$
$.38F' < R_{11} < .46F'$
$.053F' < t_1 < .065F'$
$.088F' < t_2 < .108F'$
$.033F' < t_3 < .041F'$
$.165F' < t_4 < .205F'$
$.115F' < t_5 < .140F'$
$.045F' < t_6 < .053F'$
$1.35F' = S_1$ (least mag.)
$.386F' = S_1$ (greatest mag.)
$.31F' < S_2 < .37F'$
$.035F' < S_3 < .043F'$
$.175F' = S_4$ (least mag.)
$1.07F' = S_4$ (greatest mag.)
$.0214F' < S_5 < .0254F'$ 2. A zoom type of pancratic objective for projection microscopes comprising a first positive lens member and a second positive member which are connected together for like movements as a unit, and a rearmost negative lens member which is moved differentially with respect to said positive members, each said member being composed of a negative and a positive element, said objective being formed according to the constructional data given in the table herebelow wherein $R_1$ to $R_{11}$ designate the radii of curvature of the refractive lens surfaces of the lens elements A, B, C, D, E and F named from the front of said objective rearwardly, E.F.L. designate the equivalent focal length of said elements, B.F. designates the back focus, $t_1$ to $t_6$ designate the axial thicknesses of said elements, $S_1$ to $S_5$ designate the first space and the succeeding air spaces between said elements, and $n_D$ and $\nu$ designate respectively the refractive index and the Abbe number of the glass used in constructing said elements,

[Zoom Range=75× to 300×    B.F.=Throw=Approx. 3048 mm.]

| Lens Elem. | E.F.L. | Radii | Thickness | Air Spaces | $n_D$ | $\nu$ |
|---|---|---|---|---|---|---|
| | | | | $S_1$=68.622 (when $m$=1) $S_1$=19.750 (when $m$=4) | | |
| A | −44.61 | $R_1$ =61.944 | $t_1$=3.00 | | 1.689 | 30.9 |
| | | $R_2$ =20.137 | | | | |
| B | +24.04 | $R_3$ =−30.761 | $t_2$=5.00 | | 1.524 | 51.0 |
| | | | | $S_2$=16.90 | | |
| | | $R_4$ =33.729 | | | | |
| C | −35.184 | $R_5$ =14.454 | $t_3$=1.90 | | 1.751 | 27.8 |
| | | | | $S_3$=2.00 | | |
| | | $R_6$ =18.707 | | | | |
| D | 20.21 | $R_7$ =−20.137 | $t_4$=9.50 | | 1.524 | 59.5 |
| | | | | $S_4$=8.945 (when $m$=1) $S_4$=54.481 (when $m$=4) | | |
| E | 42.85 | $R_8$ =−15.276 | $t_5$=6.50 | | 1.751 | 27.8 |
| | | $R_9$ =−12.246 | | | | |
| | | | | $S_5$=1.20 | | |
| | | $R_{10}$=−12.246 | | | | |
| F | −15.09 | $R_{11}$=21.677 | $t_6$=2.50 | | 1.506 | 59.6 |

"$m$" denotes the magnification ratio and all scalar quantities are given in millimeters.

3. A zoom type of objective for projecting a constant sized image of a variable sized object field upon an imaging surface at a continuously variable magnification, said objective having superior correction for chromatic and monochromatic image aberrations as well as distortion and flatness of field for all magnifications within a magnification range of 4, said objective comprising a front collective lens component which is optically aligned with a next rearward collective lens component and a rear dispersive lens component, said collective components being movable axially and being interconnected for identical movements together and said dispersive component being axially movable differentially with respect to the other components in such a manner that said image remains substantially stationary throughout said magnification range, the positive focal length of said front component being between 1.8 and 1.9 times the positive focal length of the second component and the fixed axial distance therebetween being between .35 times the focal length of the second component and .65 times the focal length of the front component, the negative focal length of the dispersive component being numerically between 2.6 and 2.7 times the focal length of the front component, said front component being composed of a front meniscus element having a negative focal length which is substantially .75 times the focal length of the front component and a double convex element having a positive focal length which is substantially .47 times the focal length of the front component, the second component being composed of a front meniscus element which is convex toward the front, the negative focal length thereof being numerically substantially .96 times the focal length of the second component and being further composed of a double convex element spaced rearwardly therefrom and having a positive focal length which is substantially .55 times the focal length of the second component, said negative component being composed of a front meniscus element which is concave toward the front and has a positive focal length which is substantially 2.2 times the focal length of the last component and being additionally composed of an air spaced double concave element having a negative focal length which is substantially .78 times the focal length of the last component.

4. A zoom type of projection objective according to claim 3 which is so constructed and arranged that the free aperture of said front lens component is the aperture stop for the objective whereby vignetting of the image is improved and the brightness of the image is extremely uniform for all magnifications thereof.

References Cited in the file of this patent

UNITED STATES PATENTS 1,898,905    Seitz _____ Feb. 21, 1933

FOREIGN PATENTS 440,397    Great Britain _____ Sept. 26, 1934

UNITED STATES PATENT OFFICE
CERTIFICATE OF CORRECTION

Patent No. 2,997,919                          August 29, 1961

William G. Peck

It is hereby certified that error appears in the above numbered patent requiring correction and that the said Letters Patent should read as corrected below.

Column 1, line 41, for "threof" read -- thereof --; column 4, line 39, for "thereof are designated by v," read -- therefor are designated by v, and --; line 67, for "wil" read -- will --.

Signed and sealed this 13th day of February 1962.

(SEAL)
Attest:

ERNEST W. SWIDER                      DAVID L. LADD

Attesting Officer                       Commissioner of Patents